(12) United States Patent  (10) Patent No.: US 8,238,705 B2
Lewallen et al.  (45) Date of Patent: Aug. 7, 2012

(54) CABLE ASSEMBLY HAVING BEND PERFORMANCE OPTICAL FIBER SLACK COIL

(75) Inventors: Christopher Paul Lewallen, Hudson, NC (US); James P. Luther, Hickory, NC (US); Robert B. Elkins, III, Hickory, NC (US); Costas Saravanos, Highland Village, TX (US); Elli Makrides-Saravanos, Highland Village, TX (US)

(73) Assignee: Corning Cable Systems LLC, Hickory, NC (US)

( * ) Notice: Subject to any disclaimer, the term of this patent is extended or adjusted under 35 U.S.C. 154(b) by 165 days.

(21) Appl. No.: 12/465,130

(22) Filed: May 13, 2009

(65) Prior Publication Data

US 2009/0285539 A1  Nov. 19, 2009

Related U.S. Application Data

(63) Continuation of application No. PCT/US2007/023741, filed on Nov. 13, 2007.

(51) Int. Cl.
*G02B 6/44* (2006.01)
(52) U.S. Cl. .................. 385/100; 385/135; 385/137
(58) Field of Classification Search .................. None
See application file for complete search history.

(56) References Cited

U.S. PATENT DOCUMENTS

| 4,884,863 | A |  | 12/1989 | Throckmorton | 350/96.2 |
| 4,961,623 | A | * | 10/1990 | Midkiff et al. | 385/95 |
| 5,042,901 | A |  | 8/1991 | Merriken et al. | 385/135 |
| 5,121,458 | A |  | 6/1992 | Nilsson et al. | 385/100 |
| 5,125,060 | A |  | 6/1992 | Edmundson | 385/100 |
| 5,210,812 | A |  | 5/1993 | Nilsson et al. | 385/100 |
| 5,260,957 | A |  | 11/1993 | Hakimi et al. | 372/39 |
| 5,440,665 | A |  | 8/1995 | Ray et al. | 385/135 |
| 5,485,745 | A |  | 1/1996 | Rademaker et al. | 73/151 |
| 5,528,718 | A |  | 6/1996 | Ray et al. | 385/136 |
| 5,553,183 | A | * | 9/1996 | Bechamps | 385/95 |
| 5,657,413 | A |  | 8/1997 | Ray et al. | 385/139 |
| 5,778,122 | A |  | 7/1998 | Giebel et al. | 385/55 |
| 5,881,200 | A |  | 3/1999 | Burt | 385/142 |
| 5,892,870 | A |  | 4/1999 | Fingler et al. | 385/59 |
| 5,997,186 | A |  | 12/1999 | Huynh et al. | 385/99 |
| RE36,592 | E |  | 2/2000 | Giebel et al. | 385/100 |

(Continued)

FOREIGN PATENT DOCUMENTS

EP  0465127  1/1992

(Continued)

OTHER PUBLICATIONS

Bing et al., "Low-loss Holey Fiber", Aug. 2005, Hitachi Cable Review, No. 24, pp. 1-4.*

(Continued)

*Primary Examiner* — Uyen Chau N Le
*Assistant Examiner* — Chad Smith

(57) ABSTRACT

A fiber optic cable assembly including a mid-span access location, a cable having at least fiber therein, and a tether in optical communication with the at least one fiber of the cable. The access location and portions of the cables are substantially encapsulated within a flexible body having dimensions sufficient to accommodate the optical splitter therein. A method for making a fiber optic cable assembly including an access location, distribution cable, tether and optical splitter maintained within a flexible overmolded body while providing an assembly having a relatively small cross-sectional diameter.

18 Claims, 9 Drawing Sheets

U.S. PATENT DOCUMENTS

| | | | |
|---|---|---|---|
| RE37,028 E | 1/2001 | Cooke et al. | 385/112 |
| 6,226,435 B1 | 5/2001 | Hunsinger | 385/135 |
| 6,577,801 B2 | 6/2003 | Broderick et al. | 385/125 |
| 6,621,975 B2 | 9/2003 | Laporte et al. | 385/135 |
| 6,710,366 B1 | 3/2004 | Lee et al. | 257/14 |
| 6,865,332 B1 * | 3/2005 | Saravanos et al. | 385/136 |
| 6,950,593 B2 * | 9/2005 | Hodge et al. | 385/135 |
| 6,968,107 B2 | 11/2005 | Belardi et al. | 385/127 |
| 7,054,513 B2 | 5/2006 | Herz et al. | 385/12 |
| 7,190,866 B2 | 3/2007 | Greenwood et al. | 385/103 |
| 7,590,321 B2 * | 9/2009 | Lu et al. | 385/104 |
| 2004/0052484 A1 | 3/2004 | Broeng et al. | 385/125 |
| 2005/0111800 A1 | 5/2005 | Cooke et al. | 385/100 |
| 2006/0045451 A1 | 3/2006 | Wu et al. | 385/127 |
| 2006/0193573 A1 | 8/2006 | Greenwood et al. | 385/103 |
| 2007/0212009 A1 * | 9/2007 | Lu et al. | 385/135 |

FOREIGN PATENT DOCUMENTS

| | | |
|---|---|---|
| EP | 0152811 | 5/1992 |
| JP | 62-54204 | 11/1987 |

OTHER PUBLICATIONS

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

Tyco Electronics Raychem Product Sheet, FITS FOSC—Factory Installed Termination System for Fiber Optic Cable Splices, 1999, 2 pages.

Bing, et al., "Low-loss Holey Fiber," Aug. 2005, Hitachi Cable Review, No. 24, pp. 1-4.

* cited by examiner

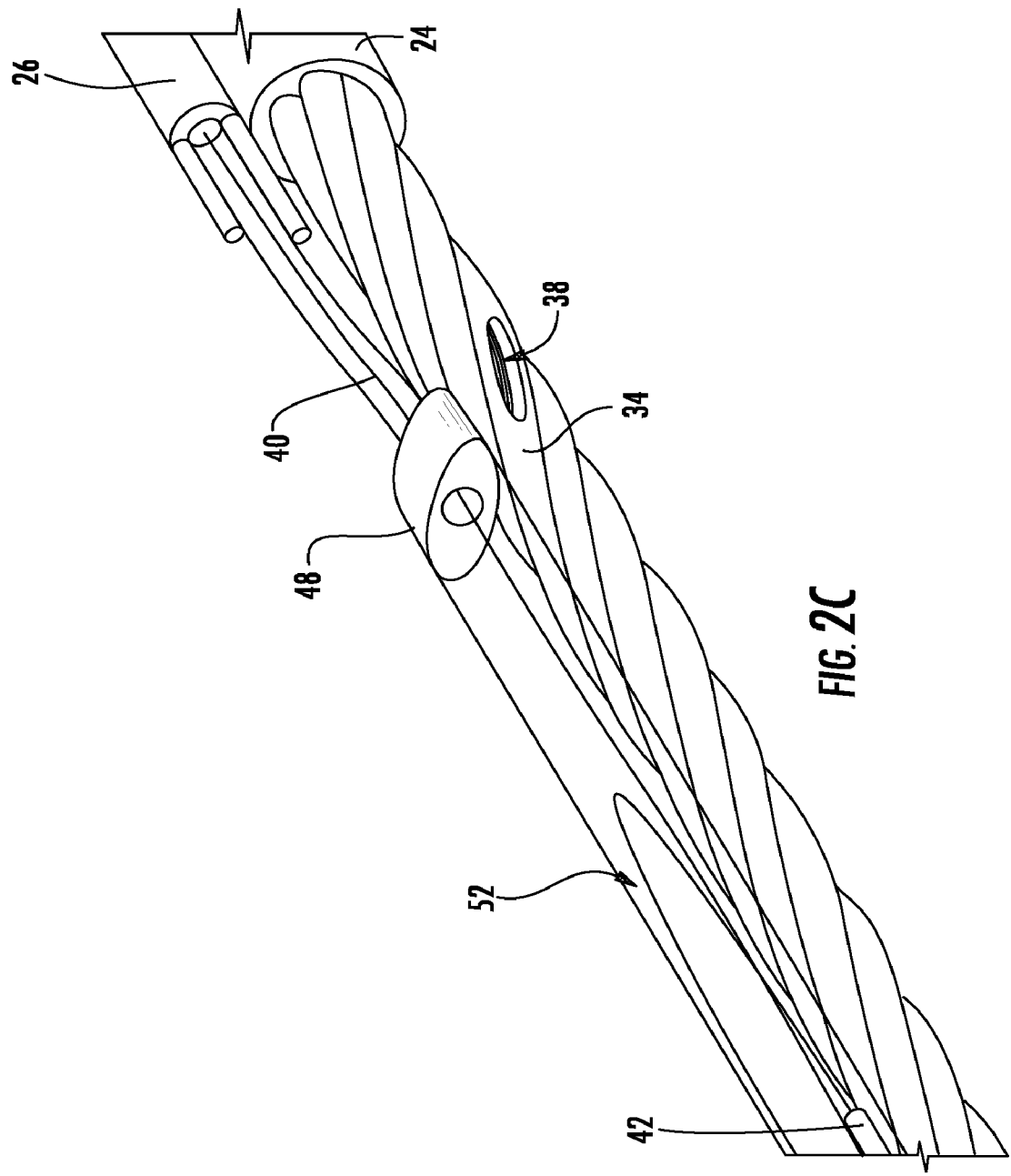

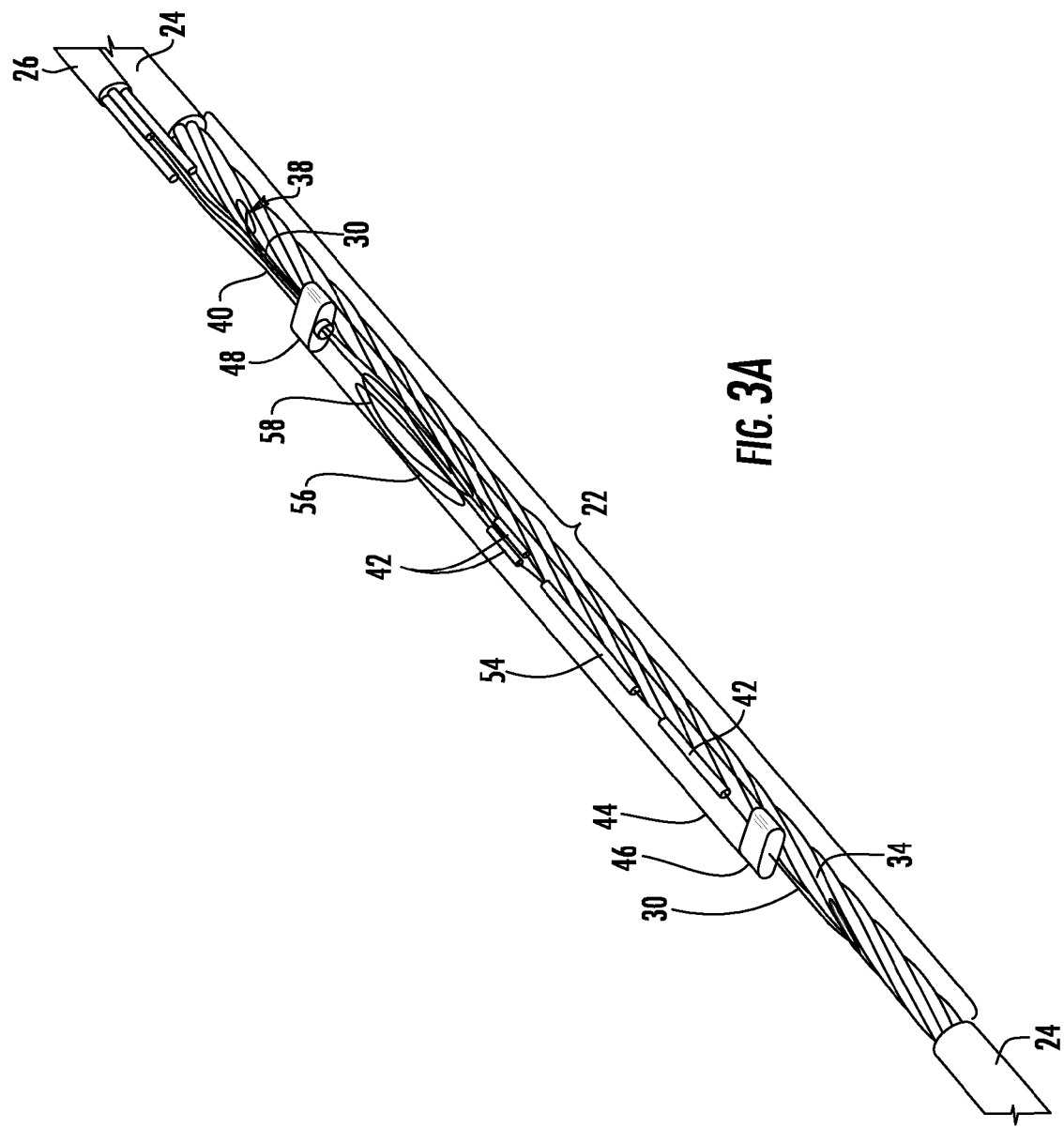

CABLE ASSEMBLY HAVING BEND PERFORMANCE OPTICAL FIBER SLACK COIL

This application is a continuation of International Application No. PCT/US2007/023741, filed Nov. 13, 2007, which claims priority to U.S. application Ser. No. 11/598,513, filed Nov. 13, 2006, both applications being incorporated herein by reference.

BACKGROUND

1. Field

The disclosure relates generally to a cable assembly for use in an FTTx optical network, and more specifically, to a low-profile fiber optic cable assembly including a flexible cable access location, tether and slack coil utilizing bend performance optical fiber.

2. Description of the Related Art

Engineered fiber optic cable assemblies are being developed to deliver services to subscribers over optical networks. These networks are commonly referred to as "FTTx" networks, wherein "FTT" stands for "Fiber-to-the" and "x" is used to generically describe a location such as a premises, home, office, desk, building, etc. An engineered cable assembly typically includes at least one mid-span access location, or tap point, at a predetermined position along the cable length at which one or more pre-selected optical fibers are preterminated and routed away from the remaining uncut optical fibers of the cable, typically through at least one tether. The term "preterminated" is used herein to refer to a fiber that is cut at a position upstream of its end. The mid-span access location and at least one tether are used for the lateral branching of optical fibers from an attached cable. The tether includes at least one optical fiber that is optically connected, typically spliced, to the preterminated fibers of the cable. The downstream end of the tether may terminate in splice-ready optical fibers, connectorized optical fibers or a tethered assembly, among others.

Engineered cable assemblies must be capable of withstanding installation forces placed upon them and must be able to be installed within a variety of installation environments, for example, within small diameter conduit. Therefore, it would be desirable to provide a cable assembly capable of being installed within conduit less than about 2 inches, more preferably less than about 1.5 inches, while resisting damage to the assembly, and particularly the fibers and splices within, during installation. Various examples of engineered cable assemblies commonly include the splice interface of the distribution cable fibers and tether fibers to be maintained within some form of closure. Rigid closures are typically inflexible to a variety of installation environments and are typically too large to be successfully installed within small diameter conduit. Flexible closures, in contrast, are typically more flexible to installation environments, but often include strength or preferential bend elements to force the flexible closure to take a predetermined shape when encountering a corner or sheave wheel. This is most often due to the use of a straight through approach of the splice fibers and the need for protecting spliced fibers routed off of the neutral axis of the cable fibers. Additional strength and bending elements are undesirable in that they require an added element, potentially form a tear point and do not always prevent a mid-span access point from flipping over, especially at high tensile loads.

A specific example of a component heavy, semi-flexible closure is described in U.S. Pat. No. 5,440,665 entitled "Fiber Optic Cable Assembly Including Main and Drop Cables and Associated Fabrication Method" (the '665 patent). The '665 patent describes a cable access point at which pre-selected optical fibers are branched, spliced and routed separately from the remaining uncut optical fibers of the distribution cable. The '665 patent states that the spliced fibers are straight through routed and must be devoid of a slack coil of optical fiber and has dimensions smaller than sufficient to accommodate the minimum bend radius of a slack coil thereof. An example of a rigid closure is described in U.S. Pat. No. 5,210,812 entitled "Optical Fiber Cable Having Spliced Fiber Branch and Method of Making Same" (the '812 patent). The '812 patent describes a rigid, clam-shell closure including pins for preventing a slack coil from forming within the closure, thus also providing a straight through approach in a larger and inflexible package. While the '665 closure is a straight through design for small diameter installation environments, it is a requirement that it be sized small enough so that it cannot accommodate a slack coil. The '812 closure also does not include a slack coil, and it is further an inflexible closure, making it difficult to install through conduit or around a sheave wheel.

Thus, what is needed is an engineered cable assembly including a mid-span access location that is substantially encapsulated with a flexible body and including an advantageous slack coil within the body, all the while providing a package capable of being installed through conduit less than about 2 inches in diameter, more preferably less than about 1.5 inches in diameter. A slack coil having a large amount of fiber in a small diameter package would be advantageous in that it may remove the need for a stiff element to make the body take a predetermined shape, and would also accommodate temperature and tensile induced fiber length changes. Further, a slack coil provided using a bend performance, bend insensitive or bend optimized fiber would allow for a slack coil without increasing the size of the package, a design not possible using conventional closures and standard single mode fiber.

SUMMARY

The present application discloses various embodiments of a fiber optic cable assembly including a fiber optic cable and at least one mid-span access location along the cable length for providing access to at least one preterminated optical fiber of the cable. The at least one preterminated optical fiber of the cable is routed away from the remaining uncut fibers of the cable and spliced or otherwise optically coupled to at least one other optical fiber. The at least one other optical fiber may be maintained within a tether or may be an optical fiber of a drop cable, both of which are referred to herein as a "tether." The tether is secured about a first end to a flexible encapsulating body, referred to herein as an "overmolded body", about the mid-span access location, and terminates at a second end at splice ready fibers, connectorized fibers, tethered assembly or the like. The overmolded body includes a slack coil or loop of optical fiber within. The largest cross-sectional diameter of the cable assembly is preferably less than about 2 inches, more preferably less than about 1.5 inches, and even more preferably less than about 1.25 inches. The slack coil may be maintained within a splice tube or within a portion of the overmolded body. The slack coil is advantageous in that it provides slack sufficient to accommodate tensile and temperature induced fiber length changes and allows the fibers to move within the tube as the cable assembly is bent. Bend performance fibers are used to reduce the diameter of the assembly while allowing for a slack coil of optical fiber.

One embodiment is directed to a factory-prepared cable assembly including a slack coil or loop of fiber within a mid-span access location or "tap point" covering formed by an overmolded encapsulating material. The overmolded body is sufficiently flexible to allow installation around sheave wheels and through conduit. Within the access location, at least one pre-selected optical fiber is spliced to at least one optical fiber of a tether. The splice interface is maintained within a splice tube. At least one of the cable fibers or the tether fibers are low bend sensitivity fibers, such as but not limited to, bend insensitive fibers, bend optimized fibers and bend performance fibers. The term "bend performance fiber" is used throughout the description and generically represents all low bend sensitivity fiber now known or hereafter devised.

In various embodiments, the bend performance fiber is microstructured optical fiber comprising a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fiber provides a mode field at a wavelength of 1310 nm preferably greater than 8.0 microns, more preferably between 8.0 and 10.0 microns. In preferred embodiments, optical fiber disclosed herein is thus single-mode transmission optical fiber.

In another embodiment, a cable assembly is disclosed that includes at least one predetermined mid-span access location positioned along the length of a distribution cable, one or more preterminated optical fibers accessed from the at least one mid-span access location, a flexible overmolded body encapsulating the mid-span access location, at least one tether attached to the distribution cable at the mid-span access location by the flexible overmolded body and one or more optical fibers of the tether optically connected to the one or more preterminated optical fibers at their upstream ends. The downstream ends of the one or more optical fibers of the tether are available for interconnecting the corresponding preterminated optical fibers with respective optical fibers of one or more fiber optic branch or drop cables. A slack coil of optical fiber is maintained within a portion of the overmolded body. At least some of the optical fibers are bend performance fibers. The cable assembly further includes at least one splitter within the overmolded body such that optical signals are provided to the tether fibers and also to the cut end of the preterminated fibers through spliced in fibers.

Additional features and advantages will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present exemplary embodiments of the invention, and are intended to provide an overview or framework for understanding the nature and character of the disclosure as it is claimed. The accompanying drawings are included to provide a further understanding of the invention, and are incorporated into and constitute a part of this specification. The drawings illustrate various embodiments, and together with the detailed description, serve to explain the principles and operations thereof.

BRIEF DESCRIPTION OF THE DRAWINGS

These and other features, aspects and advantages are better understood when the following detailed description is read with reference to the accompanying drawings, in which:

FIGS. 2A-C are perspective views of a mid-span access location including a slack coil of optical fiber and shown with the overmolded body removed for clarity;

FIGS. 3A-C are perspective views of a mid-span access location including a slack coil of optical fiber and a splitter maintained at the mid-span access location, also shown with the overmolded body removed for clarity;

DETAILED DESCRIPTION

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the scope of the invention and enable one of ordinary skill in the art to make, use and practice the same. Like reference numbers refer to like elements throughout the various drawings.

Figure 1:
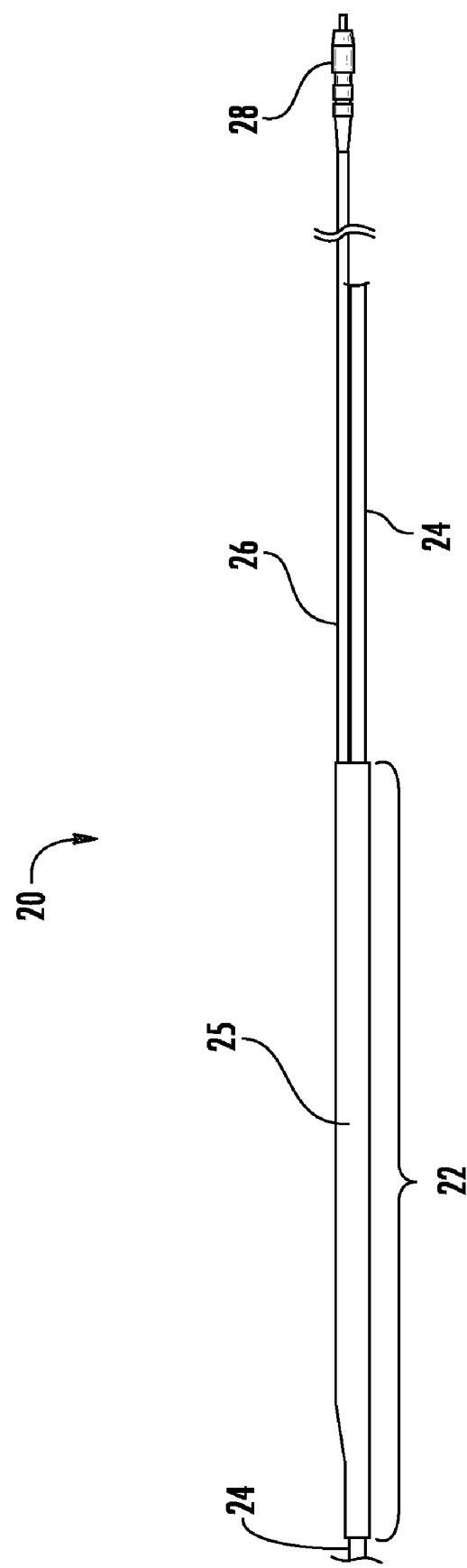
FIG. 1 is a side perspective view of a cable assembly including a mid-span access location and an attached tether.

Referring to FIG. 1, a fiber optic cable assembly 20 includes at least one mid-span access location 22 along the cable length for providing access to at least one optical fiber within the cable. In preferred embodiments, the cable assembly 20 includes a distribution cable 24 including a plurality of mid-span access locations 22 at predetermined spaced apart locations along the cable length, thus providing multiple access locations that serve as tether attach points for attaching tethers 26 to the distribution cable 24 and providing branches. The distribution cable typically includes a higher optical fiber count than a tether. The mid-span access location 22 is shown substantially encapsulated within an overmolded body 25. The overmolded body 25 is sufficiently flexible to facilitate installation and in preferred embodiments is not re-enterable without damaging the sealing integrity and structure of the body. The overmolded body may be made from any flowable material applied in any manner and allowed to cure to form a protective encapsulating body, such as by pour molding or injection molding. In alternative embodiments, the overmolded body may be substituted for any other type of closure being able to bend as much as the cable is able to bend, for example, a heat shrink closure may be used. The cable assembly may be wound onto a reel for shipping and deployment, and may be installed through conduit having a relatively small inner diameter or significant bends or through conventional aerial lashing equipment, such as sheaves or rollers. The cable assembly offers communications service providers with a low-profile assembly more resistant to damage incurred during shipping, deployment and network installation as compared to conventional rigid closures.

Preterminated optical fibers at an access location may be spliced or otherwise optically connected to at least one optical fiber of a tether having a length less than about several hundred feet, more preferably less than about 100 feet, and even more preferably less than about 25 feet. Remaining uncut optical fibers of the distribution cable extend uninterrupted through the cable and are available for terminating at other downstream mid-span access locations or at the cable end. A tether may be used to mitigate span-length measurement errors apparent after installation and provides branches off of the attached cable for routing the network to locations within reach of the tethers. Each tether may terminate in splice-ready fibers, connectorized optical fibers, a multi-port connection terminal or any tethered assembly. More than one tether may attached at one or both ends of a mid-span access location.

Various types of cables may be used to construct the cable assembly, such as monotube, loose tube, central tube, ribbon and the like. One example of a type of distribution cable shown and suitable for use in conjunction with concepts disclosed is an ALTOS® dielectric cable available from Corning Cable Systems LLC of Hickory, N.C. The ALTOS® dielectric cable is a lightweight fiber optic cable designed for both buried (conduit) and aerial (lashed) deployments. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a tube. Regardless, a preferred cable provides stable performance over a wide range of temperatures and is compatible with any type of optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. At least a portion of the cable assembly utilizes low bend sensitivity optical fiber, bend optimized optical fiber, or bend insensitive optical fiber, all of which are referred to generically herein as "bend performance optical fiber." Various types of cables may serve as a tether, such as monotube, loose tube, central tube and ribbon, and a tether may be disposed within another tubular body in a cable assembly.

Figure 2A:
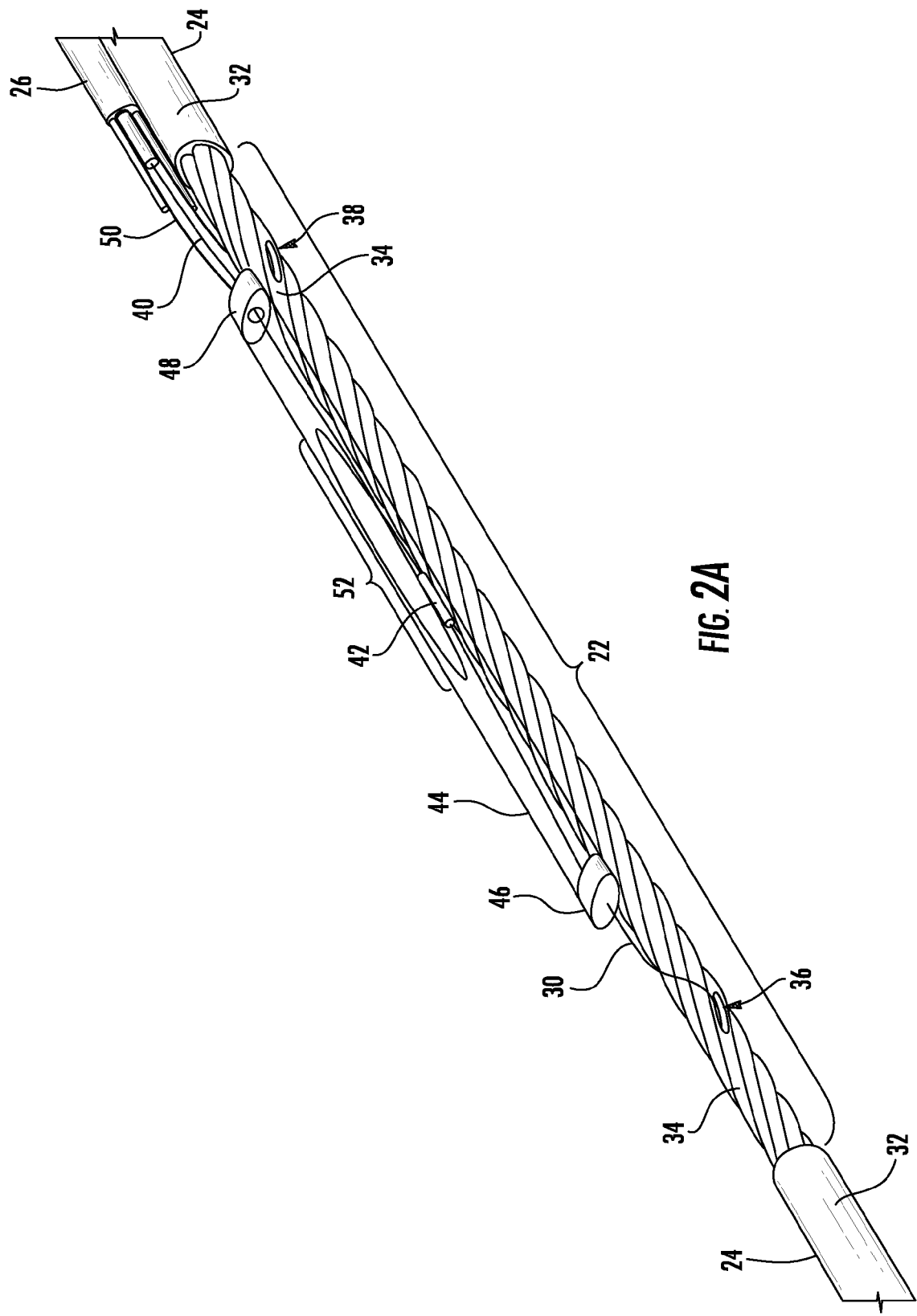
Figure 2B:
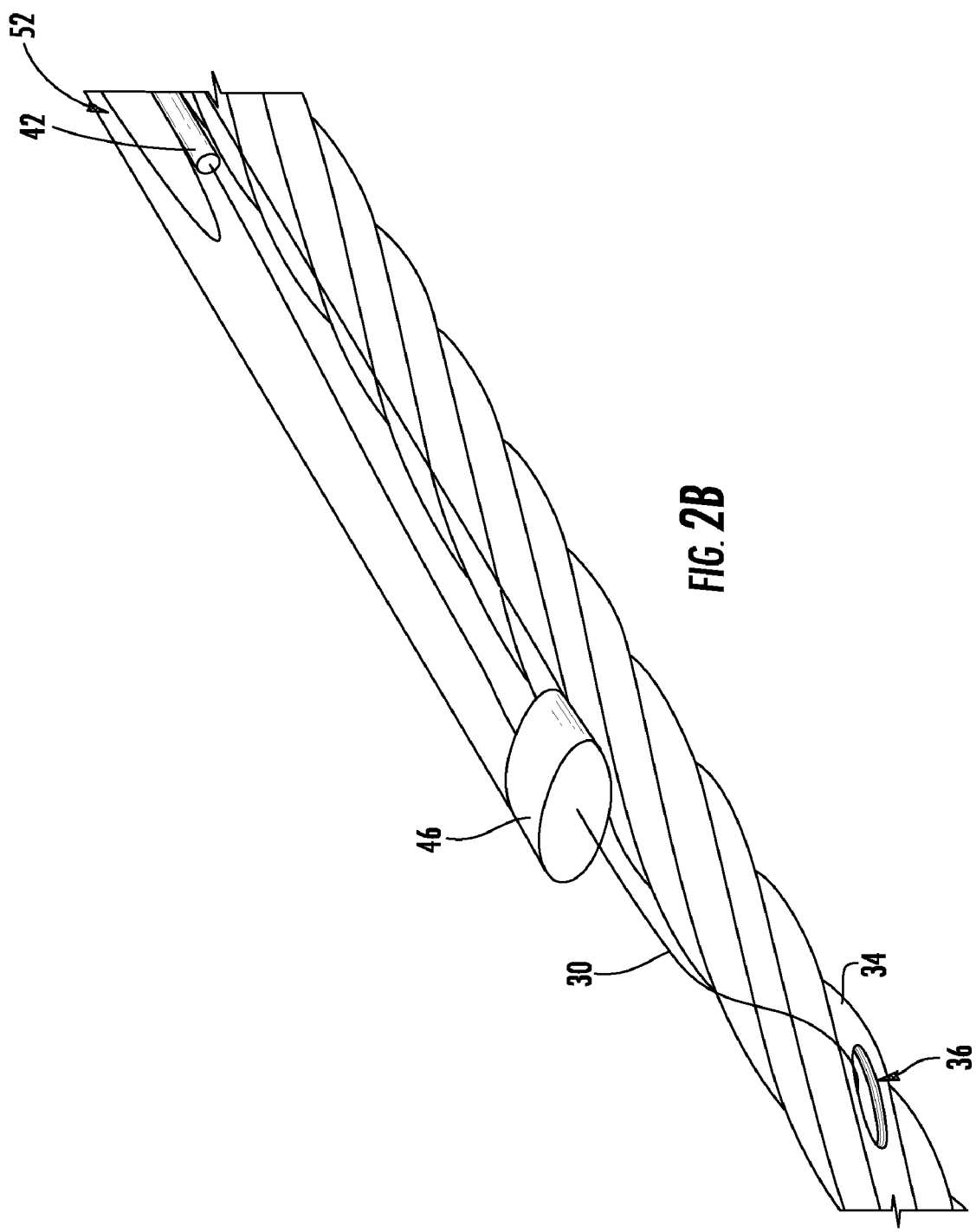

Referring to FIGS. 2A-C, a mid-span access location 22 is the location at which at least one optical fiber 30 is preterminated and routed separate from the remaining intact optical fibers of the distribution cable 24. The mid-span access location 22 is shown with the overmolded body removed for clarity. In one example of a method to create a mid-span access location, a section of the sheath 32 of the distribution cable 24 is removed to expose at least one buffer tube 34 within the sheath. As shown, the buffer tubes 34 are helically wound in a known manner. The exposed length of the distribution cable and the buffer tubes 34 may vary. However, in one embodiment, the length ranges between about 3 and about 36 inches. Ring-cuts may be made through the sheath 32 to remove a portion of the sheath and make another portion slidable along a portion of an exposed section of buffer tubes 34. With the particular cable type shown, a first opening 36 may be made on a buffer tube 34, and a second opening 38 may be made on that same buffer tube 34. Pre-selected optical fibers are preterminated (cut) at the second opening 38 and "fished" from the first opening 36 to route them away from the remaining uncut fibers. Withdrawn fiber length should be sufficient to allow at least one splice attempt.

For a given mid-span access location 22, a buffer tube 34 may be accessed using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes remain helically wrapped around a central member (not shown). The NOFAT tool provides a guide that allows a scalpel to open a buffer tube without cutting completely through the buffer tube or the optical fibers within. The NOFAT tool is compatible with standard sizes of buffer tubes utilized in Corning Cable Systems ALTOS® Cable.

The preterminated optical fiber 30 of the distribution cable 24 is shown spliced to an optical fiber 40 of the tether 26. The splice interface is shown within splice protector 42. As shown, the spliced portion and a length of fibers 30 and 40 are shown routed within a flexible length of tubing 44. The tubing 44 defines an interior cavity sufficient to accommodate a slack coil or loop of bend performance optical fiber without violating the minimum bend radius of the fiber. The tubing 44 may be shaped to reduce the profile of the assembly. The tubing may be sealed at a first end 46 at which fiber 30 enters and may define an opening at the second end 48 that allows fiber 40 to move therethrough, thus allowing the slack coil to increase or decrease in length caused by fiber movement. In alternative embodiments, the tubing 44 may be sealed at least one of its ends or may be open at least one its ends. The tubing 44 may engage another length of tubing 50 that provides a link with the tether 26. The tubing 44 may also directly engage the tether 26 in alternative embodiments. The tubing 44 provides protection of the splice interface and defines a cavity dimensioned larger than sufficient to accommodate a minimum bend radius of a slack coil 52 thereof. As shown, the slack coil 52 is a single 180 degree loop. It is envisioned that several loops may be formed and may be used to direct the tether out of the appropriate end of the access location. In an alternative embodiment, the overmolded body may define an internal cavity within, formed from either the overmolded material itself or from an added element that is dimensioned larger than sufficient to accommodate a minimum bend radius of a slack coil thereof. In one embodiment the slack coil defines a short axis having a diameter less than about 20 mm, more preferably less than about 15 mm, even more preferably less than about 10 mm.

In the embodiment shown, fiber 30 may be standard single mode fiber and fiber 40 may be bend performance fiber, thus the splice interface is positioned such that fiber 30 is not coiled or looped. In embodiments in which both fibers 30 and 40 are bend performance fiber, both or either fibers may make up a portion of the coil or loop. In embodiments in which fiber 30 is bend performance fiber and fiber 40 is standard single mode fiber, fiber 40 is not coiled or looped. Thus, coiling or looping within a cable assembly having a diameter less than about 2 inches, more preferably less than about 1.5 inches, and even more preferably less than about 1.25 inches is accomplished by using bend performance optical fiber having a minimum bend radius less than about 10 mm, preferably less than about 5 mm. The coil or loop is advantageous in that it provides extra length for splice attempts and also accommodates temperature and tensile induced fiber length changes. Further, the coil or loop is advantageous in that it eliminates the need for including strength elements that provide the cable with a preferential bend about the access location because the fibers are free to move around within tubing 44. Lubrication may be used to allow the fiber 30 to move freely within the tube. Slack may be coiled and directed such that at least one tether may be directed out of at least one end of the access location 22.

Figure 3B:
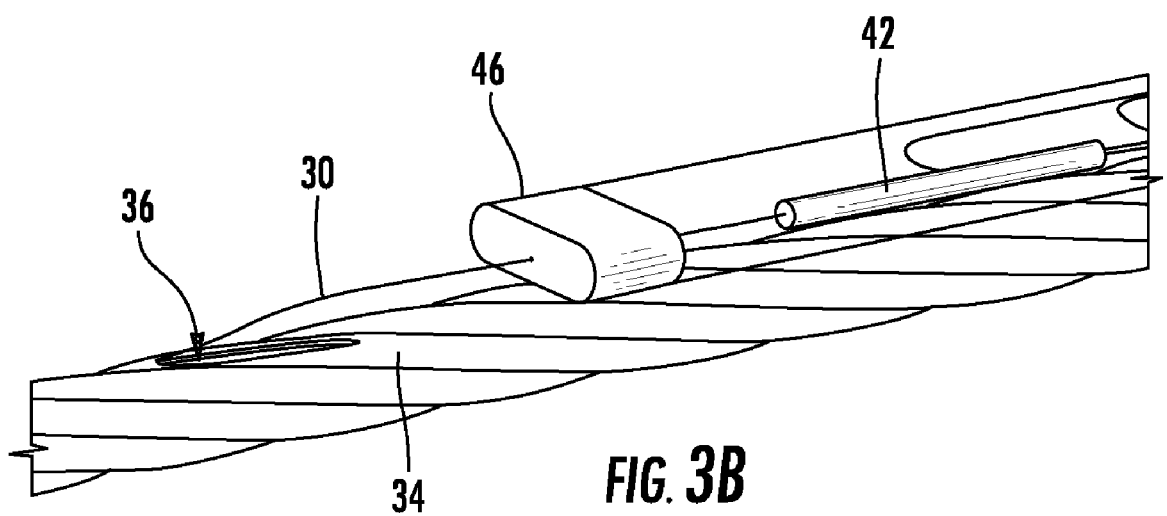
Figure 3C:
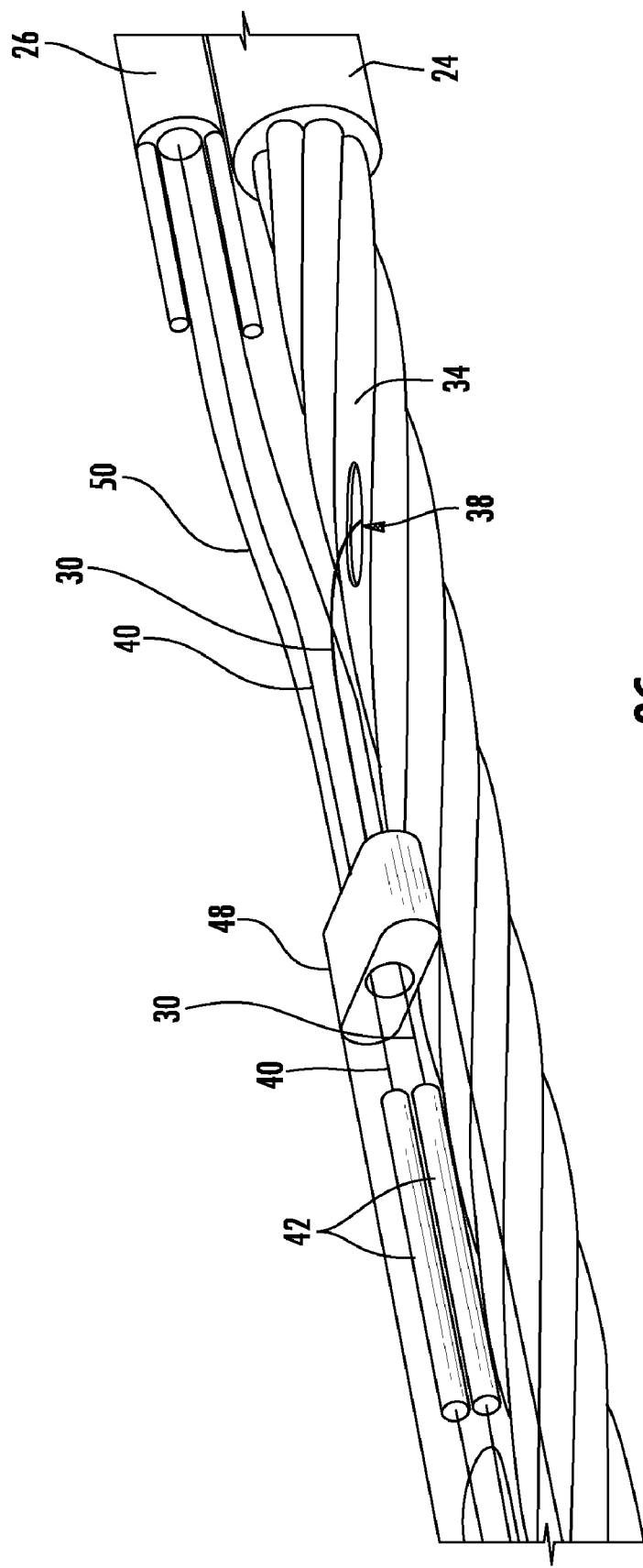

Referring to FIGS. 3A-C, another embodiment of a cable assembly including a mid-span access location 22 is shown, again with the overmolded body removed to more clearly show the internal portion of the access location 22. In this embodiment, the cable assembly includes a splitter 54 within the access location 22. The splitter 54 enables a preterminated optical fiber 30 of the distribution cable 24 to be split, thus providing optical continuity back to the downstream end of the preterminated optical fiber 30, and also at least one optical fiber that is optically connected to at least one optical fiber 40 of the tether 26. Splice holders are shown at reference numbers 42. At least one of the fibers 56, 58 of the splitter are coiled or looped. Coils and loops include bend performance optical fiber. Tether fiber 40 and buffer tube returning fiber 30 may both exit about tubing end 48. A splitter is advantageous in the cable assembly in that may eliminate the need for a fiber distribution hub. The splitter allows for the optical coupling of the tether 26 with the distribution cable 24 and also allows for continuity along the length of fiber 30 of the distribution cable 24.

One example of bend performance optical fiber suitable for forming slack coils or loops is a microstructured optical fiber comprising a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fiber disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", we mean that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the voids or holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

Figure 4:
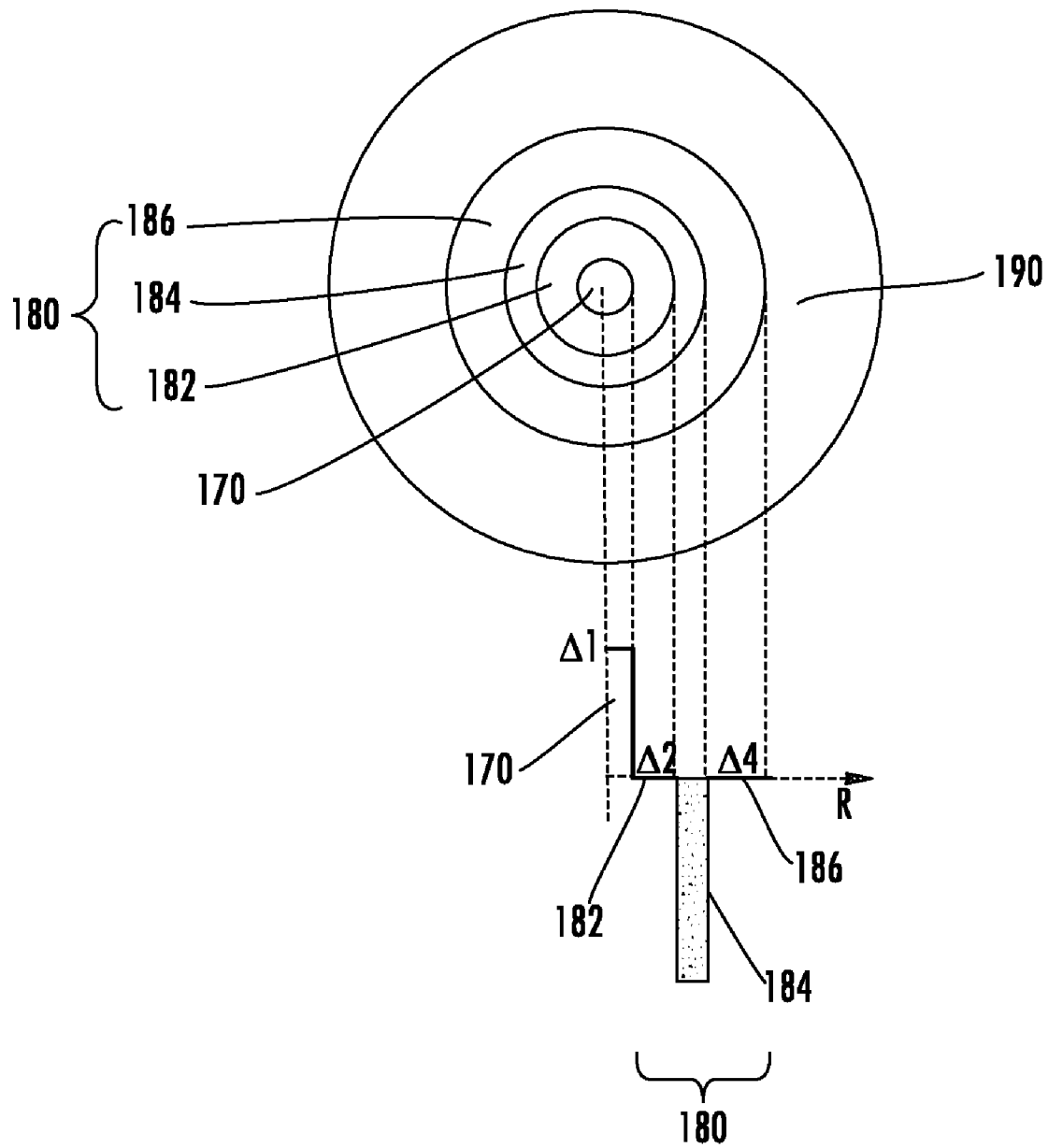
FIG. 4 is a schematic diagram illustrating a cross-section of one embodiment of a bend performance optical fiber operable for forming a slack coil within the cable assembly.

In one set of embodiments, the core region includes doped silica to provide a positive refractive index relative to pure silica, e.g. germania doped silica. The core region is preferably hole-free. As illustrated in FIG. 4, in some embodiments, the core region 170 comprises a single core segment having a positive maximum refractive index relative to pure silica $\Delta_1$ in %, and the single core segment extends from the centerline to a radius $R_1$. In one set of embodiments, 0.30%<$\Delta_1$<0.40%, and 3.0 µm<$R_1$<5.0 µm. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2-R1, and W12 is greater than 1 µm. Radius R2 is preferably greater than 5 µm, more preferably greater than 6 µm. The intermediate annular hole-containing region 184 extends radially outward from R2 to radius R3 and has a radial width W23, equal to R3-R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. The hole-containing region 184 has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss of less than 5 dB/turn, preferably less than 1 dB/turn, and more preferably less than 0.5 dB/turn, and a 8 mm macrobend induced loss of less than 5 dB/turn, preferably less than 1 dB/turn, more preferably less than 0.5 dB/turn. The wavelength associated with the attenuations is 1550 nm.

Figure 5:
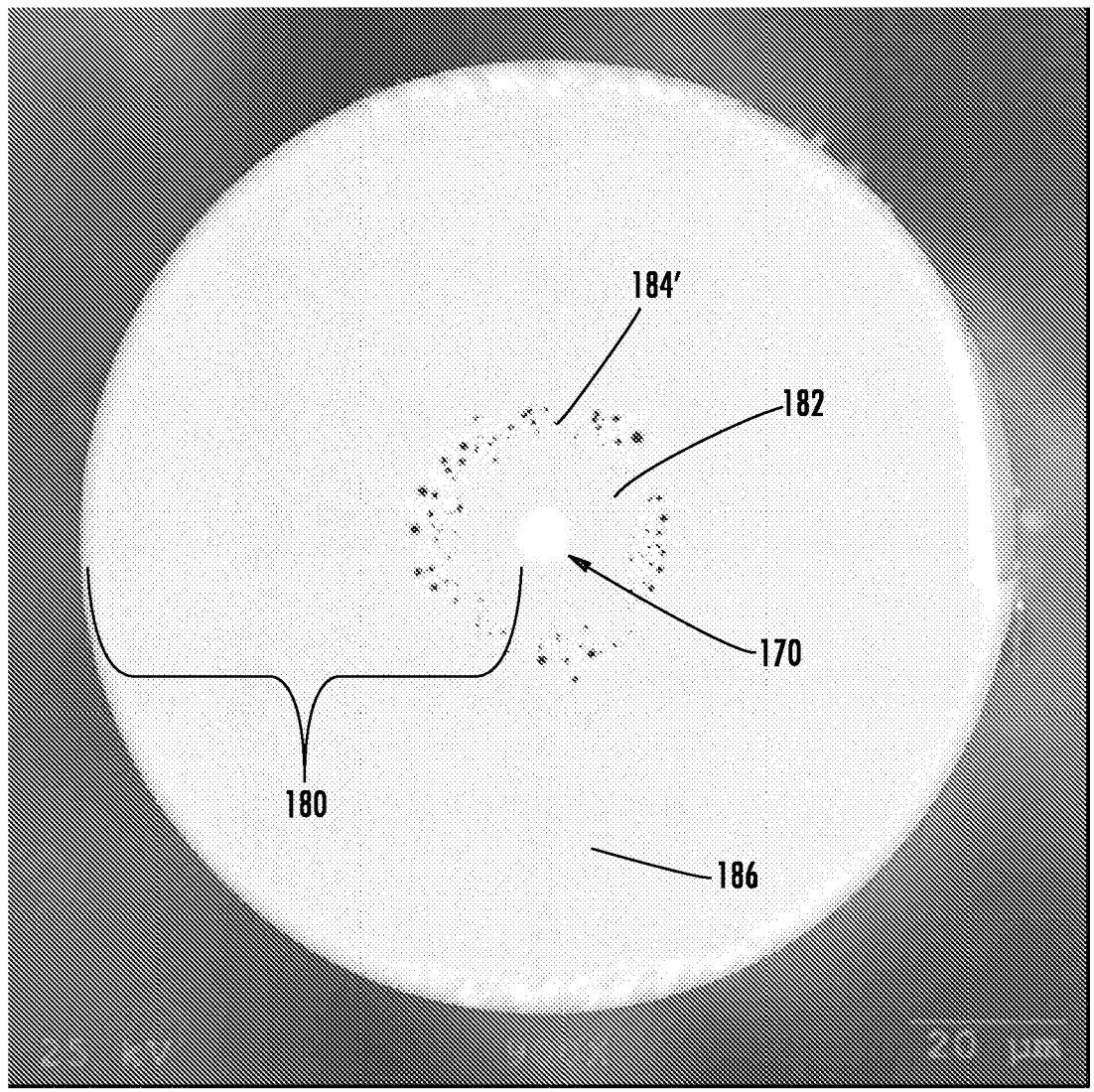
FIG. 5 is a digital cross-sectional image of a microstructured bend performance optical fiber illustrating an annular hole-containing region comprised of non-periodically disposed holes.

An example of a suitable fiber is illustrated in FIG. 5. The fiber in FIG. 5 comprises a core region that is surrounded by a cladding region that comprises randomly disposed voids which are contained within an annular region spaced from the core and positioned to be effective to guide light along the core region.

In the various cable assembly embodiments, an overmolding process may involve preparing the sheath 32 of the distribution cable 24 in a manner known in the art, such as by cleaning, roughening, flame preparing or chemically preparing the surface of the sheath 32. The overmolding process may involve placing a portion of the cable assembly including the mid-span access location to be encapsulated into an overmolding tool. Materials suitable for overmolding may include, but are not limited to, polyurethane, silicone and like materials. The overmolded body provides a protective covering, provides sealing and is capable of withstanding crush forces up to at least about 300 lbs. The degree of flexibility of an access location may depend upon the material chosen and the geometry of the underlying components. In all embodiments, the overmolded body may have any desired shape, however, the preferred shape is low profile with tapered to avoid snagging during installation.

The foregoing is a description of various embodiments of the invention that are given here by way of example only. Although cable assemblies having flexible mid-span access locations and tethers including bend performance fiber have been described with reference to preferred embodiments and examples thereof, other embodiments and examples may perform similar functions and/or achieve similar results. All such equivalent embodiments and examples are within the spirit and scope of the present invention and are intended to be covered by the appended claims.

We claim:

1. A fiber optic cable assembly, comprising:
    a fiber optic cable including at least one buffer tube with at least one cable optical fiber therein and at least one mid-span access location at which at least one pre-selected optical fiber is preterminated and routed away from uncut optical fiber through an exit opening in the buffer tube;
    at least one tether attached at the mid-span access location and including at least one tether optical fiber therein;
    a flexible body substantially encapsulating the at least one mid-span access location; and
    a splitter located at the mid-span access location and in the flexible body that splits the at least one preterminated optical fiber into a first optical fiber having a loop within the flexible body and that is optically connected to the at least one tether optical fiber and a second optical fiber that is optically connected to a downstream portion of the at least one preterminated optical fiber at a location with the flexible body;
    wherein the at least one optical fiber connected to the downstream portion of the at least one preterminated optical fiber enters the buffer tube in an in an access opening within the buffer tube; and
    wherein the fiber optic cable including the flexible body flexibly bends along the mid-span access location thereby bending the at least one preterminated optical fiber, the first optical fiber, the at least one tether optical fiber and the second optical fiber locations within the flexible body.

2. The cable assembly of claim 1, wherein the flexible body is an overmolded body.

3. The cable assembly of claim 1, wherein the at least one cable optical fiber is a microstructured optical fiber.

4. The cable assembly of claim 1, wherein the cable assembly has a cross-sectional diameter less than about 1.25 inches.

5. The cable assembly of claim 1, wherein the cable assembly further includes a tube for maintaining a slack coil of optical fiber.

6. The cable assembly of claim 5, wherein the tube is at least partially filled with a lubricant.

7. The cable assembly of claim 1, wherein at least a portion of the tether is secured by the flexible body.

8. The cable assembly of claim 1, the flexible body providing a space therein for maintaining a slack coil of spliced together portions of the at least one preterminated optical fiber and the at least one tether optical fiber.

9. The cable assembly of claim 1, wherein the flexible body does not include a preferential bend element.

10. A fiber optic cable assembly, comprising:
    a fiber optic distribution cable including a buffer tube with a plurality of optical fibers therein, the fiber optic distribution cable including an access location wherein at least one optical fiber in the buffer tube is terminated and routed away from uncut optical fibers through an exit opening in the buffer tube;
    a tether including at least one optical fiber therein;
    an optical splitter that splits the at least one terminated optical fiber into at least one optical fiber optically connected to the at least one tether optical fiber, and at least one optical fiber that is optically connected to a downstream portion of the at least one terminated optical fiber; and
    a flexible body substantially encapsulating the access location, a portion of the tether, and the optical splitter;
    wherein the at least one optical fiber connected to the downstream portion of the at least one terminated optical fiber enters the buffer tube at an access opening within the buffer tube;
    wherein the fiber optic distribution cable and the flexible body flexibly bending at a location between the access opening and the exit opening in the buffer tube, thereby bending the at least one terminated optical fiber, the at least one optical fiber optically connected to the at least one tether and the at least one optical fiber optically connected to the downstream portion of the at least one terminated optical fiber at locations within the flexible body.

11. The cable assembly of claim 10, further comprising at least one tube for maintaining a slack coil.

12. The cable assembly of claim 11, wherein the tube is at least partially filled with a lubricant.

13. The cable assembly of claim 10, wherein at least one of the plurality of optical fibers of the distribution cable and the at least one optical fiber of the tether are bend performance optical fibers.

14. The cable assembly of claim 13, wherein the bend performance optical fiber is a micro structured optical fiber.

15. The cable assembly of claim 10, wherein the flexible body has a cross-sectional diameter less than about 1.25 inches.

16. The cable assembly of claim 10, wherein the flexible body defines a space within dimensioned large enough to accommodate a minimum bend radius of a slack coil of a bend performance optical fiber.

17. A method for making a fiber optic cable assembly having an access location, fiber optic cable and a tether attached thereto, wherein at least one optical fiber of the cable is in optical communication with at least one optical fiber of the tether, the method comprising:
preterminating at least one optical fiber of the fiber optic cable, wherein the at least one preterminated optical fiber is routed away from uncut optical fibers through an exit opening in a buffer tube;
splitting at least one preterminated optical fiber of the fiber optic cable into a first optical fiber that is spliced to the at least one optical fiber of the tether and a second optical fiber that is spliced to a downstream portion of the at least one preterminated optical fiber of the fiber optic cable by:
providing an optical splitter and optically attaching the optical splitter to the at least one optical fiber of the fiber optic cable; and
attaching at least one optical fiber of the tether to the optical splitter, looping at least one optical fiber;
encapsulating the fiber optic cable and the optical splitter with a flexible body at the access location; and
flexibly bending the fiber optic cable and the flexible body at the access location, thereby bending the optical fiber and the optical fiber of the tether at locations within the flexible body, wherein the at least one optical fiber connected to the downstream portion of the at least one preterminated optical fiber enters the buffer tube at an access opening within the buffer tube.

18. The method of claim 17, wherein at least one of the preterminated optical fiber of the fiber optic cable and the at least one optical fiber of the tether are bend performance optical fiber.

* * * * *